US010587978B2

(12) United States Patent
McGibney

(10) Patent No.: US 10,587,978 B2
(45) Date of Patent: Mar. 10, 2020

(54) METHOD, APPARATUS AND COMPUTER-READABLE MEDIA FOR VIRTUAL POSITIONING OF A REMOTE PARTICIPANT IN A SOUND SPACE

(71) Applicant: Nureva, inc., Calgary (CA)

(72) Inventor: Grant Howard McGibney, Calgary (CA)

(73) Assignee: Nureva, Inc., Calgary (CA)

( * ) Notice: Subject to any disclaimer, the term of this patent is extended or adjusted under 35 U.S.C. 154(b) by 0 days.

(21) Appl. No.: 15/610,910

(22) Filed: Jun. 1, 2017

(65) Prior Publication Data
US 2017/0353811 A1 Dec. 7, 2017

Related U.S. Application Data

(60) Provisional application No. 62/345,208, filed on Jun. 3, 2016.

(51) Int. Cl.
*H04S 7/00* (2006.01)
*G06F 3/16* (2006.01)
(Continued)

(52) U.S. Cl.
CPC .............. *H04S 7/303* (2013.01); *G06F 3/165* (2013.01); *G06F 3/167* (2013.01); *H04H 60/04* (2013.01);
(Continued)

(58) Field of Classification Search
CPC .. H04M 5/568; H04M 2250/62; H04M 3/568; H04S 2420/01; H04S 7/30;
(Continued)

(56) References Cited

U.S. PATENT DOCUMENTS 4,499,578 A 2/1985 Marouf et al.
5,337,363 A 8/1994 Platt
(Continued)

FOREIGN PATENT DOCUMENTS

CA 2499033 A1 9/2005
DE 102014012158 A1 12/2015
(Continued)

OTHER PUBLICATIONS

Joseph Hector Dibiase, Thesis entitled, "A High-Accuracy, Low-Latency Technique for Talker Localization in Reverberant Environments Using Microphone Arrays", Brown University, May 2000.
(Continued)

*Primary Examiner* — Andrew C Flanders
(74) *Attorney, Agent, or Firm* — Katten Muchin Rosenman LLP

(57) ABSTRACT

Method, apparatus, and computer-readable media for virtual positioning one or more remote participants in a sound space includes structure and/or function whereby sound signals are received from a plurality of microphones in the shared space. One or more processors identifies one or more sound sources in the shared space, based on the received sound signals. The processors(s) map respective locations of the sound source(s) in the shared space, based on the received sound signals. The processor(s) receive from the remote participant(s) signals corresponding to respective position placements of the remote participant(s) in the shared space. The processor(s) mix the received sound signals to output corresponding sound signals for each participant based on relationships between (i) the respective locations of the sound source(s) and (ii) the respective position placements of the remote participant(s) in the shared space. The processor(s) then transmit the corresponding sound signals to the remote participant(s).

39 Claims, 11 Drawing Sheets

(51) Int. Cl.
*H04M 3/56* (2006.01)
*H04H 60/04* (2008.01)
*H04R 5/02* (2006.01)
*H04R 3/00* (2006.01)
*H04S 1/00* (2006.01)

(52) U.S. Cl.
CPC ............ *H04M 3/568* (2013.01); *H04R 3/005* (2013.01); *H04R 5/02* (2013.01); *H04R 2201/401* (2013.01); *H04R 2227/003* (2013.01); *H04S 1/005* (2013.01); *H04S 2400/01* (2013.01); *H04S 2400/11* (2013.01); *H04S 2400/13* (2013.01); *H04S 2400/15* (2013.01); *H04S 2420/01* (2013.01)

(58) Field of Classification Search
CPC ...... H04S 7/302; H04S 7/303; H04S 2400/11; G06F 3/165; G06F 3/167
See application file for complete search history.

(56) References Cited

U.S. PATENT DOCUMENTS

| | | | |
|---|---|---|---|
| 5,477,270 | A | 12/1995 | Park |
| 6,624,841 | B1 | 9/2003 | Buchner et al. |
| 6,912,718 | B1 | 6/2005 | Chang et al. |
| 6,961,439 | B2 | 11/2005 | Ballas |
| 7,058,168 | B1* | 6/2006 | Knappe ............... H04L 12/1822 370/260 |
| 7,130,705 | B2 | 10/2006 | Amir et al. |
| 7,177,413 | B2* | 2/2007 | O'Toole ................. H04M 3/56 379/202.01 |
| 7,533,346 | B2* | 5/2009 | McGrath ............ H04L 12/1822 715/757 |
| 7,720,212 | B1* | 5/2010 | Jouppi .................... H04M 3/56 370/351 |
| 7,848,531 | B1 | 12/2010 | Vickers et al. |
| 8,014,884 | B2* | 9/2011 | Kindo ................. H04M 1/6083 700/94 |
| 8,073,125 | B2* | 12/2011 | Zhang .................. H04M 3/568 379/202.01 |
| 8,185,387 | B1 | 5/2012 | Lachapelle |
| 8,363,810 | B2* | 1/2013 | Yoakum ................ H04M 3/568 370/260 |
| 8,462,190 | B2* | 6/2013 | Togami .................. G10L 21/00 348/14.01 |
| 8,958,569 | B2* | 2/2015 | Bar-Zeev ............. G10L 21/0208 381/122 |
| 9,823,893 | B2* | 11/2017 | Bhat ....................... G06F 3/167 |
| 2002/0064149 | A1 | 5/2002 | Elliott et al. |
| 2002/0077830 | A1 | 6/2002 | Soumela et al. |
| 2004/0013252 | A1* | 1/2004 | Craner .................. H04M 1/247 379/142.01 |
| 2004/0257432 | A1 | 12/2004 | Girish et al. |
| 2008/0085014 | A1 | 4/2008 | Chen et al. |
| 2009/0238378 | A1* | 9/2009 | Kikinis .............. H04N 13/0296 381/92 |
| 2010/0070281 | A1 | 3/2010 | Conkie et al. |
| 2010/0135118 | A1 | 6/2010 | Van Leest |
| 2010/0312547 | A1 | 12/2010 | Van Os et al. |
| 2011/0022393 | A1 | 1/2011 | Waller et al. |
| 2011/0074693 | A1 | 3/2011 | Ranford et al. |
| 2012/0121076 | A1* | 5/2012 | Yoakum .............. H04L 12/1822 379/202.01 |
| 2013/0101134 | A1 | 4/2013 | Betts-Lacroix |
| 2013/0144629 | A1 | 6/2013 | Johnston et al. |
| 2013/0257780 | A1 | 10/2013 | Baron |
| 2014/0078075 | A1 | 3/2014 | Wilensky et al. |
| 2014/0119552 | A1 | 5/2014 | Beaucoup |
| 2014/0222436 | A1 | 8/2014 | Binder et al. |
| 2015/0382127 | A1* | 12/2015 | Sun .......................... H04S 7/30 381/17 |
| 2016/0006879 | A1 | 1/2016 | Dickinns et al. |
| 2016/0026434 | A1 | 1/2016 | Johnston et al. |
| 2016/0075016 | A1 | 3/2016 | Laurent et al. |
| 2016/0103655 | A1 | 4/2016 | Klein |
| 2016/0124706 | A1 | 5/2016 | Vasilieff et al. |

FOREIGN PATENT DOCUMENTS

| | | |
|---|---|---|
| EP | 0 479 604 A2 | 4/1992 |
| EP | 2 063 419 A1 | 5/2009 |
| WO | 1992/009921 A1 | 6/1992 |
| WO | 97/33450 A1 | 9/1997 |
| WO | 2009/117450 A1 | 9/2009 |
| WO | 2016/197257 A1 | 12/2016 |

OTHER PUBLICATIONS

Transmittal; International Search Report; and Written Opinion of the International Searching Authority for International Application No. PCT/CA2017/050672 dated Oct. 10, 2017.
U.S. Appl. No. 62/346,263, filed Jun. 6, 2016.
Transmittal; International Search Report; and Written Opinion of the International Searching Authority for International Application No. PCT/CA2017/050691.
Written Opinion of the International Examining Authority for International Application No. PCT/CA2017/050690, dated Apr. 26, 2018.
Transmittal; International Search Report; and the Written Opinion of the International Searching Authority for International Application No. PCT/CA2017/050690, dated Sep. 25, 2017.
International Preliminary Report on Patentability for International Application No. PCT/CA2017/050690, dated Aug. 13, 2018.

\* cited by examiner

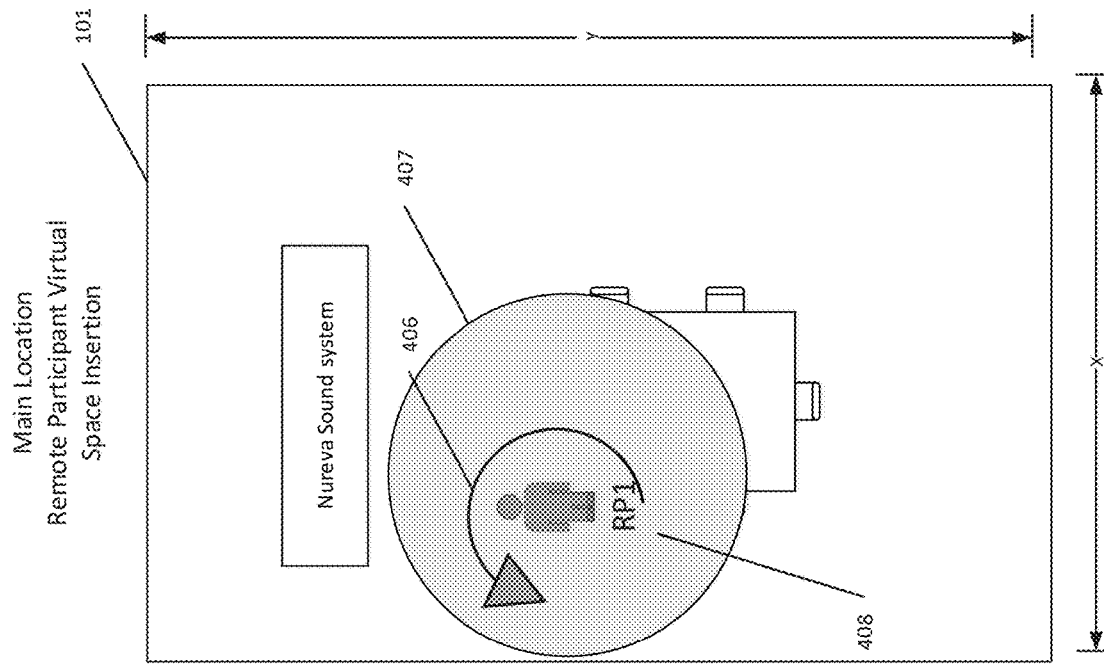
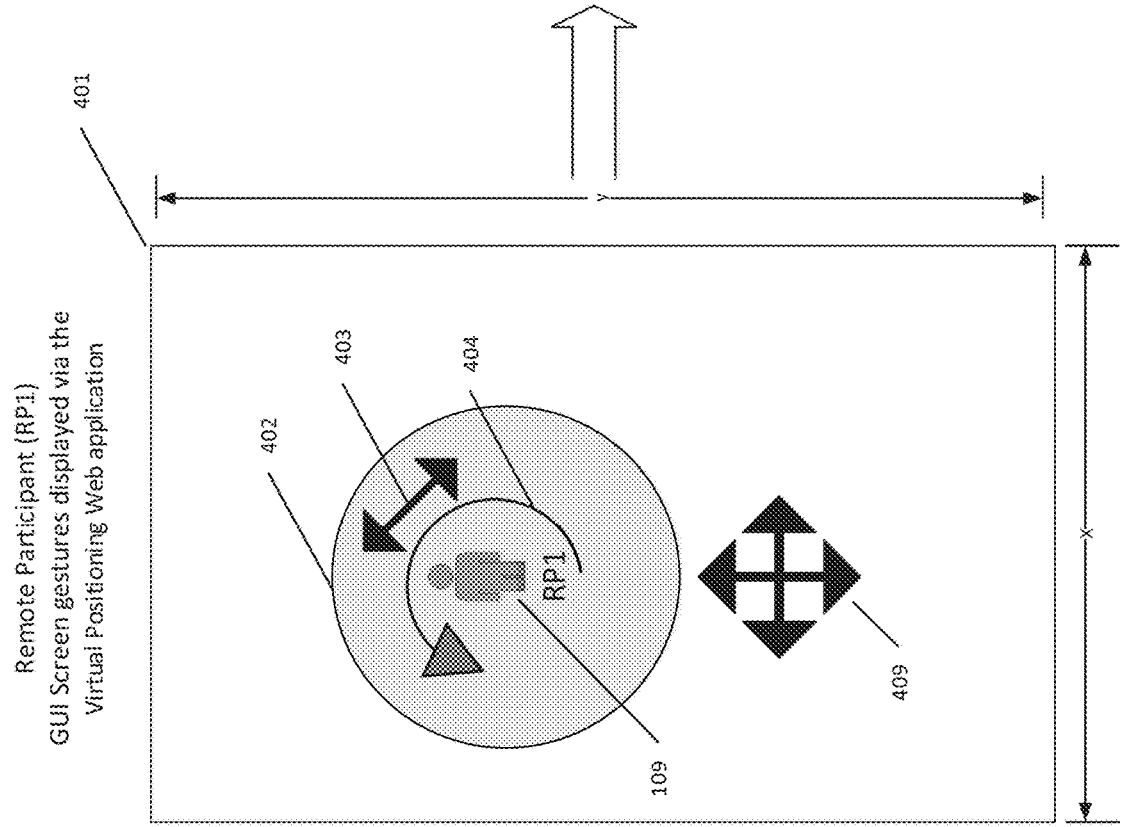

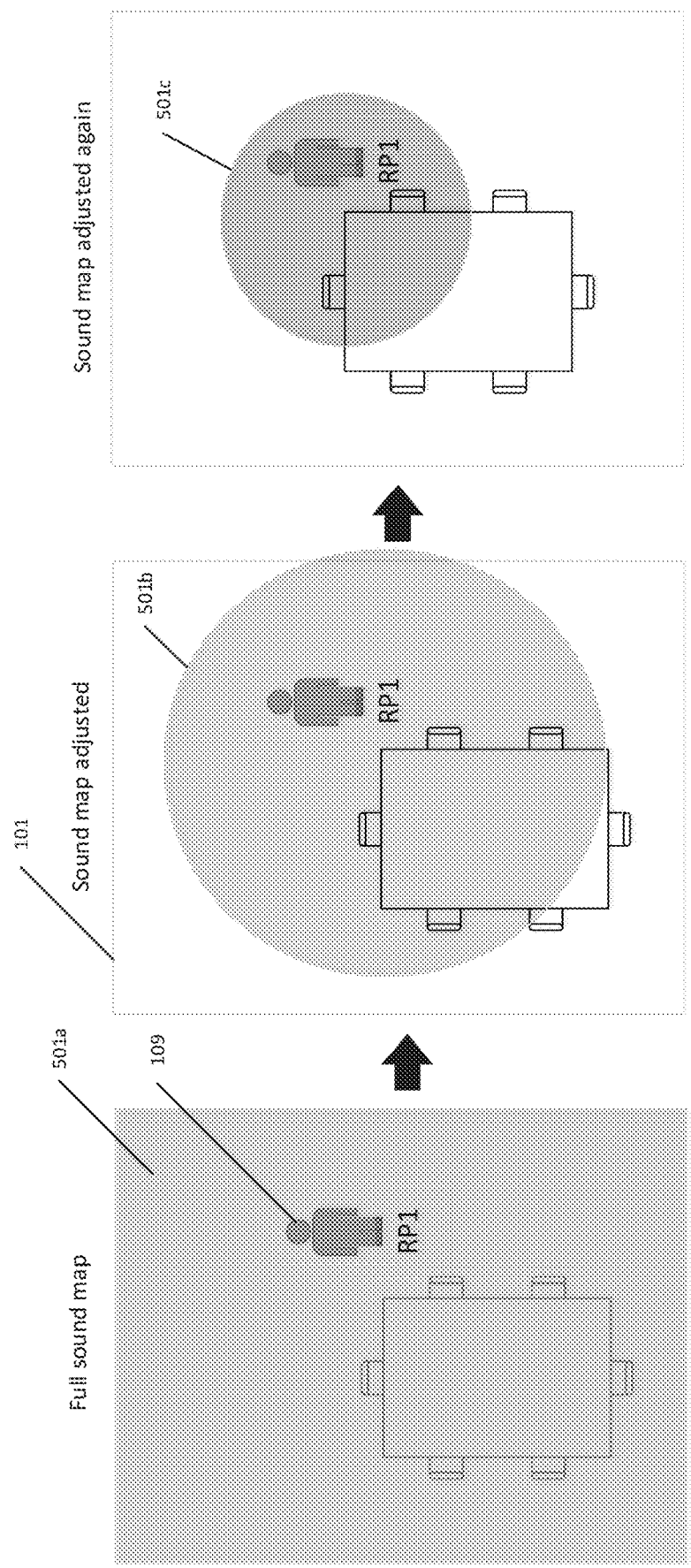

METHOD, APPARATUS AND COMPUTER-READABLE MEDIA FOR VIRTUAL POSITIONING OF A REMOTE PARTICIPANT IN A SOUND SPACE

This application claims priority to U.S. Provisional Patent Application No. 62/345,208, filed Jun. 3, 2016, the entire contents of which are incorporated herein by reference.

TECHNICAL FIELD OF THE INVENTION

The present invention generally relates to sound source audio relative to virtual positioning in a space of remote participants for real-time multi-user space communications.

BACKGROUND

There have been various approaches to solving sound issues to create an immersive remote participant experience such that the audio and video is of sufficient quality to allow for and enable clear communications. While existing solutions tend to focus on audio and video parametric performance parameters, they tend to not address an immersive remote participant experience allowing for a rich immersive experience that enables the remote participant to have a high degree of control over their audio experience in the form of space virtual positioning, sound source selection and rejection, as well as being able to dynamically adjust the microphone field focus to tailor the audio communication to their specific needs and points of interest.

The remote participant typically does not have control over the sound source audio quality and sound source microphone selection during a call other than being able to mute their personal microphone, and/or add (as known in the prior art) simple audio post processing for the creation of various listening effects, such as stereo presentation, which are not truly representative of the sound source audio. Since the audio is controlled at the main location, the remote participant is subject to various non-consistent situations—such as, but not limited to: variable microphone-to-participant relationships resulting in sound quality issues; not being able to direct or select the microphone based on who is speaking at the time; not being able to confine or expand the microphone field of pickup as needed; not being able to isolate unwanted noise sources and/or other conversations in the space. By the very nature of the source signals in the prior art, the information does not contain positional and/or spatial information allowing for the creation of a 3D sound field with individual Left & Right sound characteristics to give the remote participant a sense of direction and spatial sense of the source space and participants' specific locations.

Traditional methods use multiple microphone placements which may or may not use the strength of the signal at the microphone to select the correct microphone, which at that point becomes the desired source signal that is passed to the conference system and sent to the remote participants. This is problematic because it results in a mono audio or basic audio-only signal that contains no other information that remote participants can use to tailor their experience. Remote participants do not have control of the main location's microphones selection so they are limited to the quality of the source equipment and the layout of the microphones and microphone arrays. There is no control information passed back from the remote participant to the main conference system that would allow for control switching to the desired sound source. If there are multiple remote participants, they all get the exact same experience and are forced to focus and listen to the audio content that is determined by the source system. If there are noise sources or multiple people talking, the remote participants have no control on an individual basis who or what they want to listen to and what sounds they want to defocus.

U.S. Pat. No. 6,961,439 describes a method and apparatus for producing virtual sound sources that are externally perceived and positioned at any orientation in azimuth and elevation from a listener. In this system, a set of speakers is mounted in a location near the temple of a listener's head, such as for example, on an eyeglass frame or inside a helmet, rather than in earphones. A head tracking system determines the location and orientation of the listener's head and provides the measurements to a computer which processes audio signals, from an audio source, in conjunction with a head related transfer function (HRTF) filter to produce spatialized audio. The HRTF filter maintains the virtual location of the audio signals/sound, thus allowing the listener to change locations and head orientation without degradation of the audio signal. The audio system produces virtual sound sources that are externally perceived and positioned at any desired orientation in azimuth and elevation from the listener.

U.S. Pat. No. 5,337,363 describes a method for producing three dimensional sound associated with an object that is moving from a first position to a second position with respect to the listener. The method includes the effects of Doppler shifting, head shadowing, distance-on-frequency components of the sound, as well as the volume of the sound, and the natural sensitivity of the human ear in the 7-8 kHz range. The method provides for a sequence of digital sound samples which are converted into analog waveforms, and for production of audio signals which will provide sound queues to the listener for the location of the sound in three dimensional space.

EPO Patent Application No. EP0479604 A2 discloses an omnipresent sound system for use by a listener in an artificial reality system which operates to couple sound with presented objects such that, as the sound moves with respect to the user, the user will have the perception of the changing sound both in pitch and in volume. The sound system is comprised of a series of piezoelectric elements spaced apart around a user's head. The system is designed to program each element individually so as to create the illusion of omnipresent three-dimensional sound in conjunction with images presented to the listener, which images define an artificial environment.

Patent Application No. WO1992009921 describes a method and apparatus for creating sounds in a virtual world. The system provides signal processing capabilities to convert monaural sounds to fully spacialized sound sources. A user of the system wearing a pair of stereo headphones perceives live, computer generated, or recorded sounds as coming from specific locations in space, just a listener does in the real world.

There is opportunity for improvement in the current approaches to managing the desired source sound field. Since the current art is focused on giving the main location the control of what is heard or not heard, which inherits the limitations of the implementation of the system, the remote user is at the mercy of the main space's participants and system limitations. This is problematic as various noise sources that cannot be filtered out at the source may dominate the audio content, which reduces the intelligibility of the audio signal. The prior art is further limited as there could be multiple people speaking and only one conversation is germane to the conference. And the remote users have no control to adjust and focus their experience to the relevant conversation, leaving the remote users having to decipher or lose the conversation. In the art, spatial and position attributes of the sound source signal are not transmitted to the remote participant who is left with a flat typically mono based signal to listen to. This is limiting as it does not immerse the remote participant in the space to allow for a rich experience and relational positional location with the sound source having a direction and a position. And because the signal is the same for each remote participant, they cannot adjust and tailor their listening experience to focus on their point of interest, which results in less effective remote participant participation.

The present invention is intended to overcome the limitations and drawbacks of the prior art.

SUMMARY OF THE INVENTION

It is an object of the present invention to be able to create an immersive remote participant experience that gives remote participants control of their received audio selection and sense of being in the actual space, rather than just listening, is not addressed in the prior art.

The present invention allows remote participants to have control of their audio experience by managing sound source selection and size of the sound field area, which allows for (i) focusing on the desired sound source(s) signals and (ii) defocusing undesired sound source signals, resulting in a sound mapped experience—as if they are actually positioned in the space with all spatial stereo audio information intact, as per their setup parameters. The result is a communication audio technique that addresses the limitations of the current art.

One embodiment of the invention for remote virtual participant space listening and positioning comprises using the output parameters of a bubble processor and the input configuration parameters of a Remote Participant System to generate a correct left and right stereo audio and position signals that are representative of the virtual person facing position in the actual space; including desired sound field mapping through focus settings, which alters the listening area that the remote participant is interested in hearing. As a result, remote participants are able to tailor their experiences to their unique situational needs in real-time, creating an immersive experience.

Since the remote participants can determine their virtual positions in the main multi-user space and tailor their sound listening experiences accordingly, they can optimize their listening positions and experiences. A 3D space with a Nureva sound system (preferably comprising the hardware described below plus a commercial audio power amplifier such as Applied Research and Technology model SLA4, a set of speakers such as Yorkville Sound model C110, and a set of microphones based on a standard condenser package such as the CUI model CMA-4544PF-W) can also utilize the remote participant's desired configured virtual position and direct it to the closest speaker in the main multi-user space, thus completing the full simulation of the remote participants.

The invention is composed of both algorithms and special hardware accelerators to implement the application.

According to a one aspect of the present invention, a method for simulating a presence of one or more remote participants in a shared space includes (i) receiving, from a plurality of microphones, sound signals of the shared space; (ii) identifying, by one or more processors, one or more sound sources in the shared space based on the received sound signals; (iii) mapping, by the one or more processors, respective locations of the one or more sound sources in the shared space, based on the received sound signals; (iv) receiving, by the one or more processors and from the one or more remote participants, signals corresponding to respective position placements of the one or more remote participants in the shared space; (v) mixing the received sound signals to output corresponding sound signals for each of the one or more remote participants based on relationships between (a) the respective locations of the one or more sound sources and (b) the respective position placements of the one or more remote participants in the shared space; and (vi) transmitting the corresponding sound signals to the one or more remote participants.

According to another aspect of the present invention, a sound mixing apparatus has an interface configured to receive, from a plurality of microphones, sound signals of a shared space. A network interface is configured to receive, from one or more remote participants, respective position placements in the shared space. One or more processors is/are configured to: (i) identify one or more sound sources in the shared space based on the received sound signals; (ii) map respective locations of the one or more sound sources in the shared space based on the received sound signals; (iii) mix the received sound signals to output corresponding sound signals for each of the one or more remote participants based on relationships between (a) the respective locations of the one or more sound sources and (b) the respective position placements of the one or more remote participants in the shared space; and (iv) transmit the corresponding sound signals to the one or more remote participants via the network interface.

According to yet another aspect of the present invention, at least one computer readable storage medium stores one or more programs, the one or more programs comprising instructions, which when executed by one or more processors perform a method comprising: (i) receiving, from a plurality of microphones, sound signals of a shared space; (ii) identifying one or more sound sources in the shared space based on the received sound signals; (iii) mapping respective locations of the one or more sound sources in the shared space based on the received sound signals; (iv) receiving, from one or more remote participants, respective position placements in the shared space; (v) mixing the received sound signals to output corresponding sound signals for each of the one or more remote participants based on relationships between the respective locations of the one or more sound sources and the respective position placements of the one or more remote participants in the shared space; and (vi) transmitting the corresponding sound signals to the one or more remote participants.

BRIEF DESCRIPTION OF THE DRAWINGS

FIGS. 4a and 4b are illustrations of how a virtual participant can be rotated in the multi-user space.

FIGS. 5a, 5b, and 5c are representations of the sound field mapping capability.

DETAILED DESCRIPTION OF THE PRESENTLY PREFERRED EXEMPLARY EMBODIMENTS

Figure 1A:
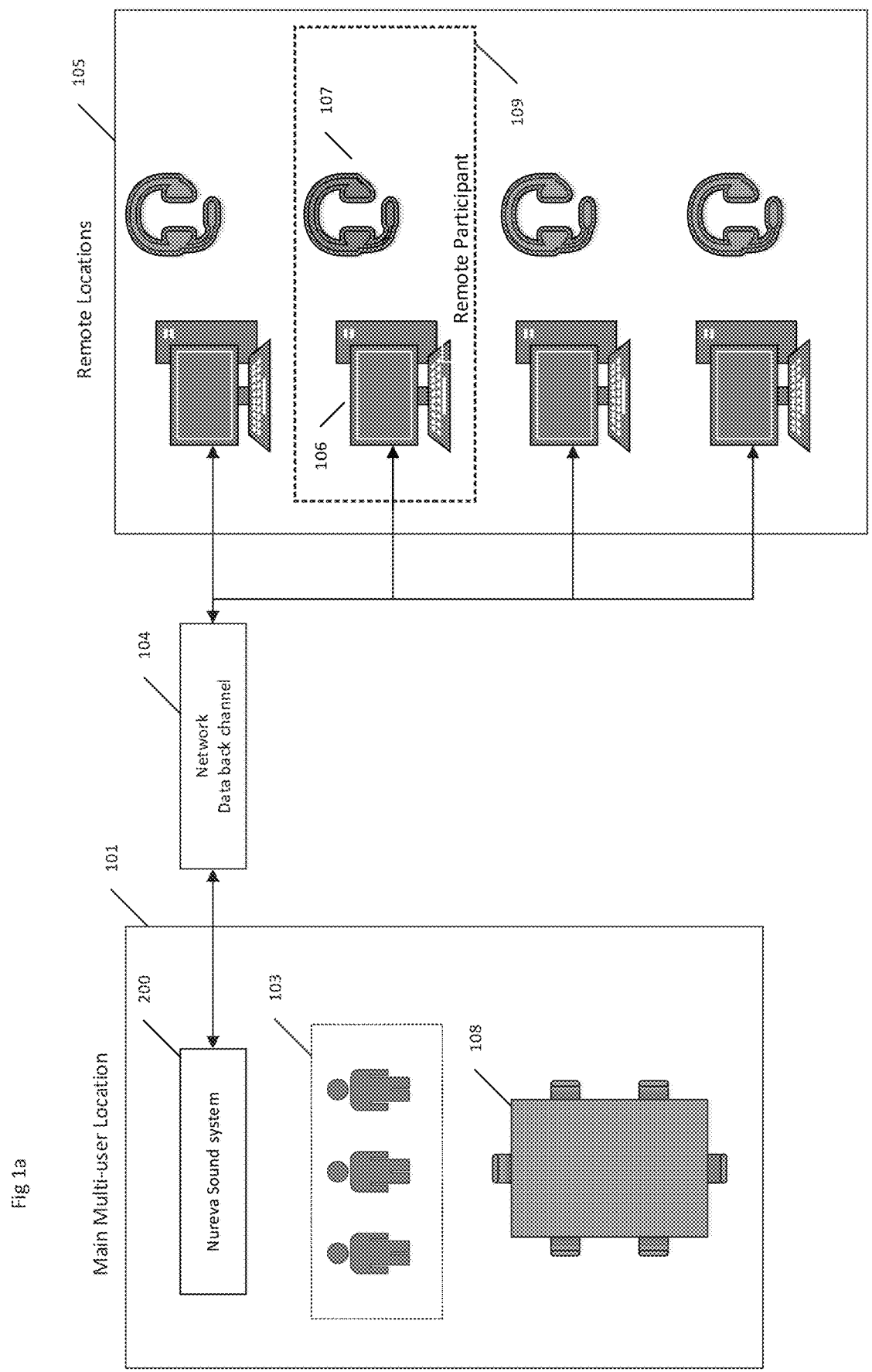
FIG. 1a is a diagrammatic illustration of a Nureva sound system Install with a Remote Participant System for remote participants.

The present invention is directed to systems and methods that enable groups of people, known as participants, to join together over a network, such as the Internet or similar electronic channel, in a remotely distributed, real-time fashion, employing personal computers, network workstations, or other similarly connected appliances or devices, without face-to-face contact, to engage in effective audio conference meetings that utilize large multi-user spaces (spaces) with distributed participants.

Advantageously, embodiments of the present systems and methods provide an ability to provide remote participants the capability to focus the in-multiuser-space microphone array to the desired speaking participant and/or sound sources. And the present invention may be applied to any one or more shared space(s) having multiple microphones for both focusing sound source pickup and simulating a local sound recipient for a remote listening participant.

It is important to establish good quality immersive and spatially accurate audio for conference or multi-person audio with a plurality of remote participants and in-space participants. The remote participants are usually constrained to the placement of the microphones in the multiuser space, which limits their ability to reduce unwanted sound sources, and are, as a result, not able to control the focus on the desired sound sources. In the present embodiments, it is desirable to give the remote participants the ability to manage (i) the desired microphone placement and (ii) focus direction to give an in-space presence that is optimized for desired individual sound source pickup, while reducing unwanted sound sources.

Implementation of the process is preferably on at least one field programmable gate array (FPGA) or, equivalently, it could be implemented on one or more application-specific integrated circuit (ASIC), or one or more Digital Signal Processor (DSP). On the FPGA is a processor core that can preferably do all the basic operations in parallel in a single clock cycle. Twelve copies of the processor core are preferably provided, one for each microphone to allow for sufficient processing capability. This system now can compute 60 operations in parallel and operate at a modest clock rate of 100 MHz. A small DSP processor for filtering and final array processing may also preferably be used. The processing functions (in the sound system, processors, and the remote participant processors) can be performed by any of the above and any suitable combination of Personal Computers, servers, cloud-based devices, etc.

The words computational device, computer and device are used interchangeably and can be construed to mean the same thing.

A "device" in this specification may include, but is not limited to, one or more of, or any combination of processing device(s) such as, a cell phone, a Personal Digital Assistant, a smart watch or other body-borne device (e.g., glasses, pendants, rings, etc.), a personal computer, a laptop, a pad, a cloud-access device, a white board, and/or any device capable of sending/receiving messages to/from a local area network or a wide area network (e.g., the Internet), such as devices embedded in cars, trucks, aircraft, household appliances (refrigerators, stoves, thermostats, lights, electrical control circuits, the Internet of Things, etc.).

An "engine" is preferably a program that performs a core function for other programs. An engine can be a central or focal program in an operating system, subsystem, or application program that coordinates the overall operation of other programs. It is also used to describe a special-purpose program containing an algorithm that can sometimes be changed. The best known usage is the term search engine which uses an algorithm to search an index of topics given a search argument. An engine is preferably designed so that its approach to searching an index, for example, can be changed to reflect new rules for finding and prioritizing matches in the index. In artificial intelligence, for another example, the program that uses rules of logic to derive output from a knowledge base is called an inference engine. A "module" may comprise one or more engines and/or one or more hardware modules, or any suitable combination of both.

As used herein, a "server" may comprise one or more processors, one or more Random Access Memories (RAM), one or more Read Only Memories (ROM), one or more user interfaces, such as display(s), keyboard(s), mouse/mice, etc. A server is preferably apparatus that provides functionality for other computer programs or devices, called "clients." This architecture is called the client-server model, and a single overall computation is typically distributed across multiple processes or devices. Servers can provide various functionalities, often called "services", such as sharing data or resources among multiple clients, or performing computation for a client. A single server can serve multiple clients, and a single client can use multiple servers. A client process may run on the same device or may connect over a network to a server on a different device. Typical servers are database servers, file servers, mail servers, print servers, web servers, game servers, application servers, and chat servers. The servers discussed in this specification may include one or more of the above, sharing functionality as appropriate. Client-server systems are most frequently implemented by (and often identified with) the request-response model: a client sends a request to the server, which performs some action and sends a response back to the client, typically with a result or acknowledgement. Designating a computer as "server-class hardware" implies that it is specialized for running servers on it. This often implies that it is more powerful and reliable than standard personal computers, but alternatively, large computing clusters may be composed of many relatively simple, replaceable server components.

The servers and devices in this specification typically use the one or more processors to run one or more stored "computer programs" and/or non-transitory "computer-readable media" to cause the device and/or server(s) to perform the functions recited herein. The media may include Compact Discs, DVDs, ROM, RAM, solid-state memory, or any other storage device capable of storing the one or more computer programs.

Figure 1B:
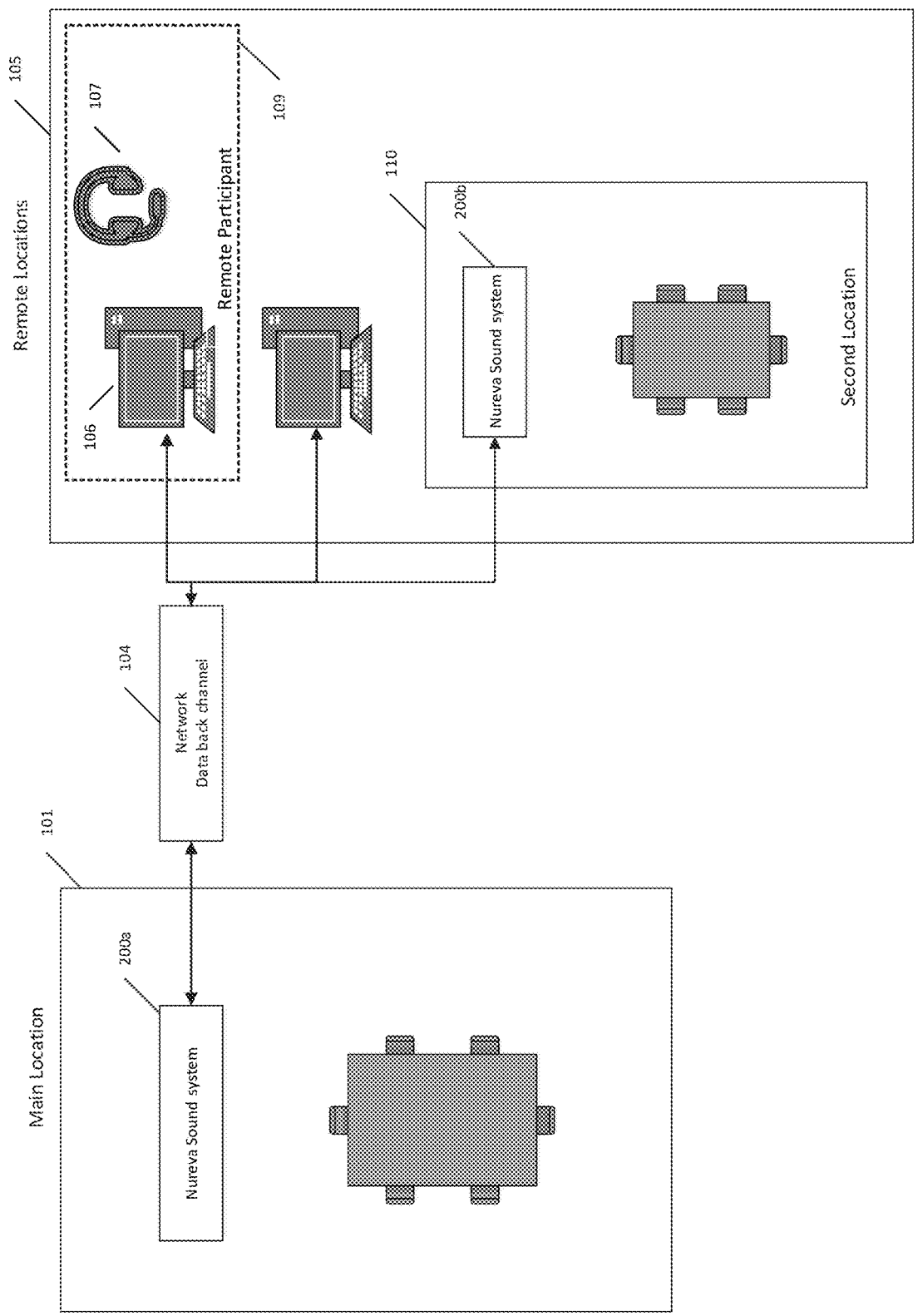
FIG. 1b is a diagrammatic illustration of two Nureva sound system Installations with additional remote participants.

FIGS. 1a and 1b together illustrate a layout of the Nureva sound system and Virtual Positioning Web application in a sound space modeled as three distinct functional blocks. FIG. 1a illustrates a single Nureva sound system 200 with a plurality of remote participants 105. The main multi-user location 101 can be any space, cabin and/or room that contains a plurality of participants 103 who may or may not be seated at a table 108, standing at a white board (not shown), and standing at a wall space and/or even moving in the space. A participant is any individual that is within range of the system. Sound sources can be individuals, noise sources—such as, but not limited to, heating, air conditioning, fans, environmental, mechanical—and all other audio sources, such as speakers. The multi-user space 101 contains the Nureva sound system 200, which contains all the required hardware and software to manage the audio sound in the space 101 for microphone configuration, sound pick up, sound masking, echo cancellation, virtual positioning, and the speaker system. The shared space typically includes the 3D space within a conference room, hall, office, or any combination of these. A sound field permeates the shared space and includes all sounds extant within the spaces, including ambient sound penetrating into the space. A sound mask is as described in PCT/CA2016/000146 (designating the U.S.), filed Nov. 24, 2016, the entire contents of which are incorporated herein by reference.

The Nureva sound system is preferably made up of the audio system 228 and the virtual position system 222. The Nureva sound system 200 preferably communicates the outbound and inbound signal traffic, which is made up of control and intelligence signals that include, but are not limited to, audio streams, positional and user position information, through the network 104 to remote locations 105. The Nureva sound system 200 preferably communicates with the remote locations 105 utilizing the main and back channel information with technologies—such as, but not limited to, Web Real-Time Communications (WebRTC) and/or Object Real-Time Communications (ORTC), which is used to communicate the high bandwidth real-time control and intelligence signals through an open framework for the web, that enables Real Time Communications in the browser, such as network, audio and video components used in voice and video chat applications.

A remote location can be made up of a plurality of remote participants 109, each using a PC 106 with video and audio capability running a Virtual Positioning Web application 401 connected to a stereo capable headset and microphone device 107. Although a headset is shown, any audio listening device is suitable at the remote user end, such as but not limited to, audio speakers and ultrasonic speakers. Through the Virtual Positioning Web application 401, the remote participants 105 are able to adjust, utilizing the control signals via WebRTC, the audio and position in space 101. Parameters—such as, but not limited to, position, direction and sound field size—are processed through the Nureva sound system 200 and sent back through the WebRTC Channel 104 to the remote participants 105.

FIG. 1b illustrates a system layout with multiple Nureva sound system systems 200a and 200b and multi-user space 110 incorporated into the system 100. The remote participants 105 can configure their presence in each space 101 and 110 separately and as a result be able to hear their unique sound position, direction and sound field mapping within the context of each space.

Figure 2:
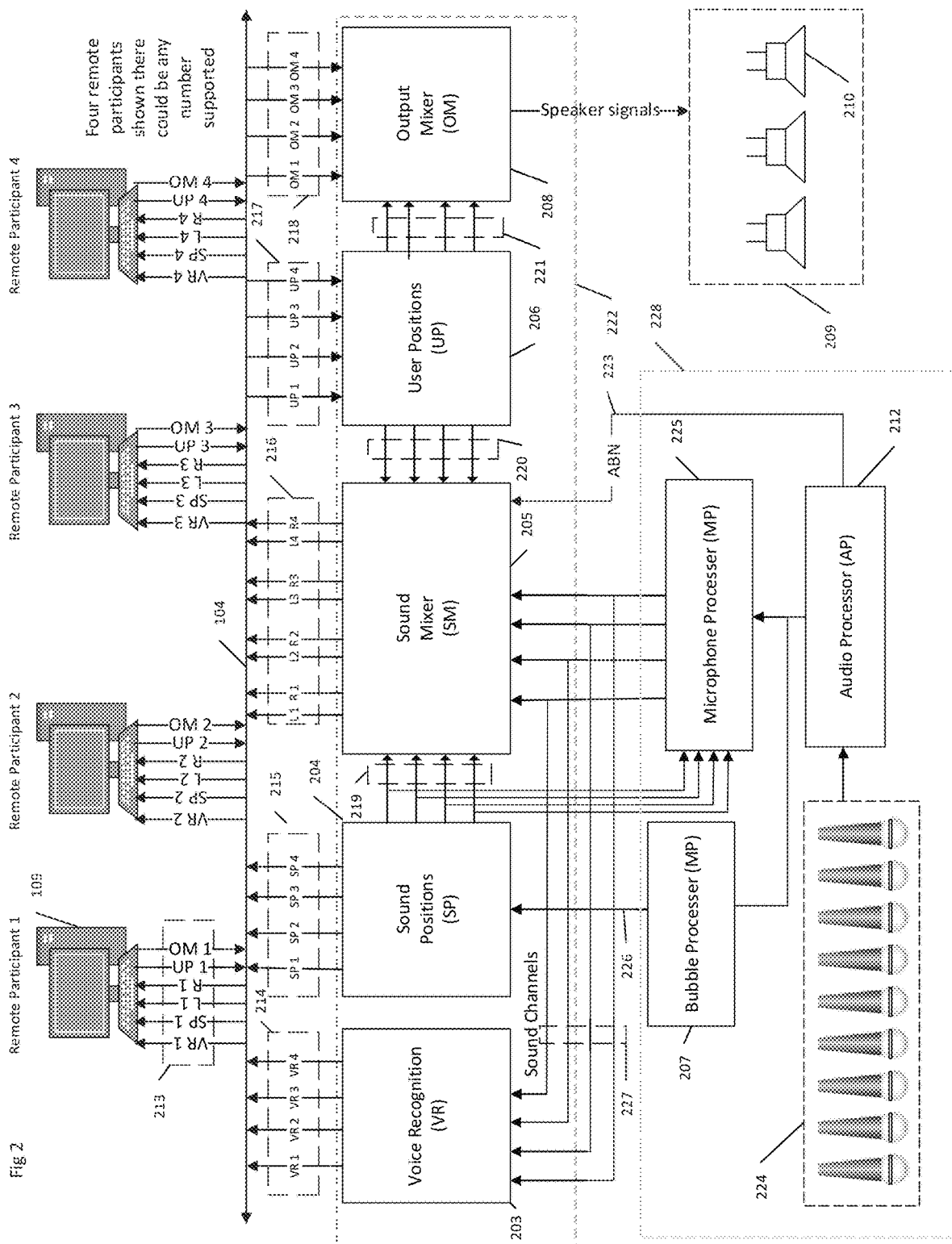
FIG. 2 is a diagrammatic representation of the functional modules and signal flow.
Figure 10:
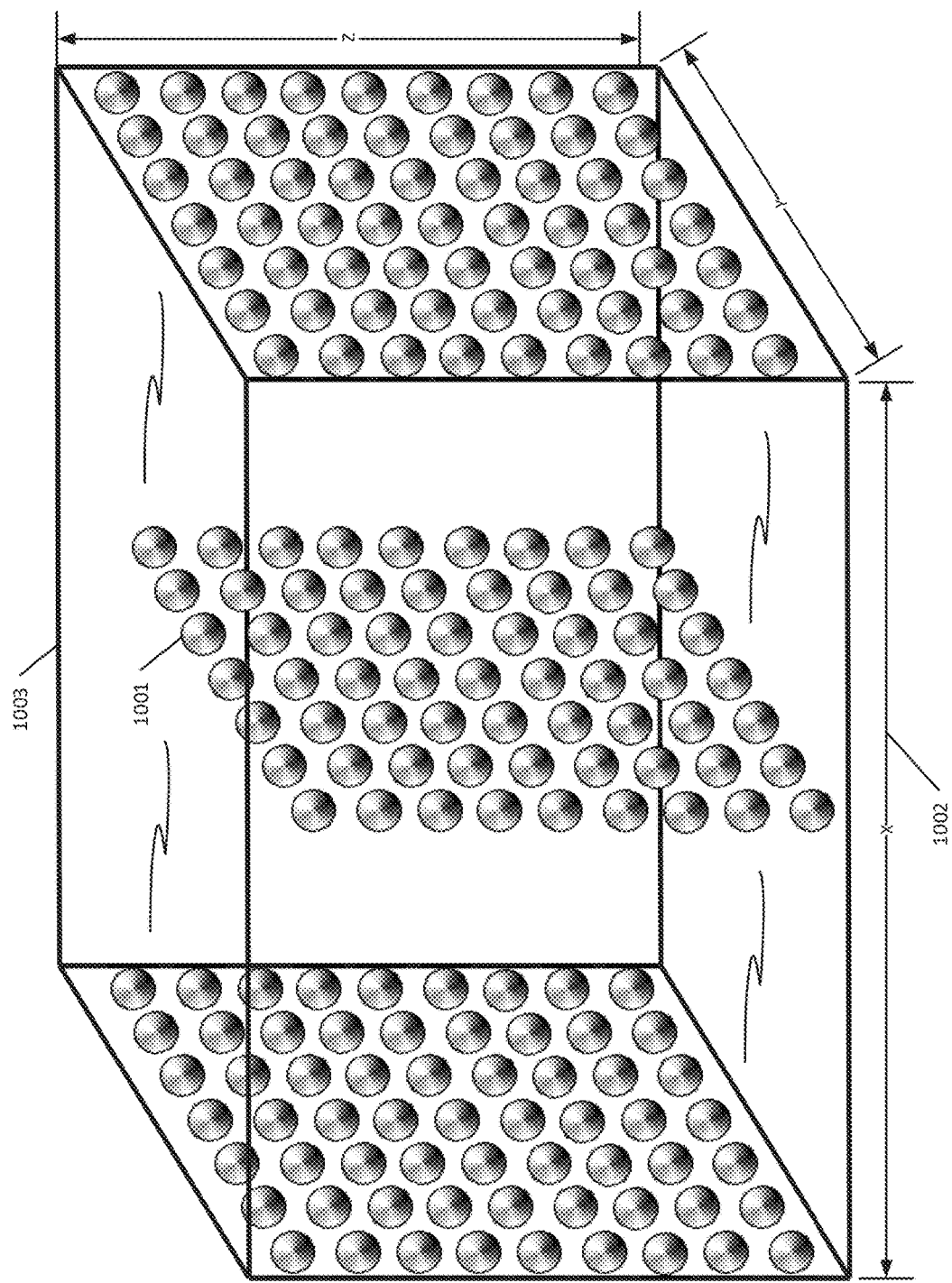
FIG. 10 is an illustration of how the virtual microphone bubbles are mapped to a 3D space.

FIG. 2 illustrates the Nureva sound system having a Virtual Positioning processor 222, which comprises the voice recognition module 203, sound position module 204, sound mixer 205, user position module 206 and output mixer 208. One or more of these modules may be housed in one or more servers, PCs, laptops, pads, or other devices. The Nureva sound system 200 also contains the audio system processor 228, which includes a microphone array 224, an audio Processor 212, a microphone processor 225, and a bubble processer 207. And the Nureva sound system 200 also contains the speaker system 209, which is made up of individual speakers 210. All modules are shown with respect to signal and functional flow relationships. Audio processor 212 is used to source sound signals from the dynamically created microphone array 224, creating a sound mask (a natural sounding noise signal emanating from the speakers that is designed to mask very quiet or distance sounds that may be distracting) and providing echo cancellation dynamically in real-time. The signals are passed into the bubble processor 207, which creates a 3D virtual microphone field, as shown in FIG. 10, with thousands of individual virtual microphones mapped out in a (x,y,z) coordinate system 1002. Bubble Processor details may be found in U.S. Provisional Patent Application No. 62/343,512, filed May 31, 2016, the entire contents of which are incorporated herein by reference. As depicted in FIG. 2, the "remote participant" may, in fact, comprise one or more remote shared spaces.

The processing gain for each virtual microphone position 1001 (FIG. 10) within a predefined bubble size is determined. Utilizing this information, a 3D sound field 1003 can be created. And further processing in regards to remote participant 109 positioning can be accomplished, creating a realistic binaural signal with directional stereo audio information transmitted to the remote participant 109. This is accomplished with the virtual position processor 222 preferably comprising a specific sound mixer 205, which is mixing for four remote participants 109 (for illustration only) and can be dynamically scaled to a plurality of remote participants 109, as needed. The sound mixer 205 takes in the sound position signals 219, mono individual microphone processor 225 audio signals 227, and the user position signals 220 to derive a unique L/R 2 channel audio sound mix 216 (for example, if the sound source is to the left of virtual position of the participant, the system will slightly delay and attenuate the signal to the right ear with respect to the left to simulate what would happen if the participant were in the room) for each individual remote participant 109, which is transmitted via the network 104. As adjustments are made by the remote participant 109 for desired in-space position and direction, including sound field size, the sound mixer 205 rebuilds the 2 channel audio stream 216 to give correct spatial information, filtered and attenuated audio signal (the typical filter would be an all-pass filter with a delay that has a maximum of 2 ms when the sound source is directly to the left or right of the virtual user position and falls off with a cosine function to zero when the source is directly in front or behind; the typical attenuation will be a reduction of 10% in sound pressure when the source is directly to the left or right of the virtual position and falls off with a cosine function to zero when the source is directly in front or behind; both the delay filter and attenuation being applied to the far ear) to a remote participant 109, which will be perceived as if the remote participant 109 was actually in the space 101 in the exact location and facing direction desired. Note that the sound field may be any shape, e.g., circular, spherical, rectilinear 2D and/or 3D, trapezoidal 2D and/or 3D, oblong 2D and/or 3D, or any shape which may include projections or indents to accommodate different desired and/or undesired sound sources. Additionally, there may be more than one sound field for any participant or groups of participants.

The sound position unit 204 functionality can determine the sound source positions utilizing the 3D virtual bubble microphone matrix processing gain values 226, which are passed from the bubble processor 207. The processing gains for each microphone are examined to find the virtual microphone that has the largest processing gain and that is assigned to one of the four tracked sound source positions. That sound source will continue to be tracked (stationary or moving sound source(s), tracked in time and/or position) as long as there is a significant peak in the processing gain in the vicinity of that sound source. It will continue to be tracked until either it is lost for a given timeout period or four more recent strong signals are found. The sound position unit 204 sends position packets 215 through the network 104 at a rate of approximately 10 packets per second utilizing a technology—such as, but no limited to, WebRTC—to communicate the sound source positions to the Remote participant 109 web application, which can be used to display sound source location in a calibrated virtual space representing the multi-user space. The sound position unit 204 also sends the spatial positions and activity levels of the sound sources 219 of the four tracked positions to the microphone mixer 225 and sound mixer 205.

The raw microphones inputs from the microphone array 224 and the tracked sound positions 219 go into a microphone mixer 225, which combines the raw microphone 224 inputs to produce a mono sound channel 227 that is focused on each of the tracked sound sources. The user position unit 206 receives network packets 217 from the remote participants that indicate where each user wishes to be in the space, the direction that they wish to be facing, and the size of the sound field that they desire (for example the user may position themselves 3.2 m east of the west wall and 2.3 m north of the south wall, facing in the compass direction 40 degrees, and listening to all signals within a 2 m radius). The user position unit 206 stores the positions and passes the information signals 220 to the sound mixer 205 and additional signals 221 to the output mixer 208.

The sound mixer 205 creates a unique stereo sound output 216 for each of the participants 109. For each participant, it determines which of the sound sources are active and within the participant's desired sound field. It determines the angle of each sound source from the participant's virtual location and orientation and mixes a stereo signal for each (using known methods of different delays, gains, and filters on the left and right channels) so that the sound is presented to the remote participant 109 as if they are in the space at the specified virtual position. For example, if the sound source is to the left of the virtual position of the participant, the system would send a signal with more delay and attenuation in the right channel of the stereo signal. If there are more than one active sound sources within the participant's sound field, then they are added together. If there are no active sound sources within the sound field, then only the ambient space noise is sent. To accomplish this, the sound mixer 205 requires the sound position signals 219 from the sound position unit 204 and an ambient noise signal 223 from the audio processor 212 and the mono sound channels 227 from the microphone processer 225.

Figure 8:
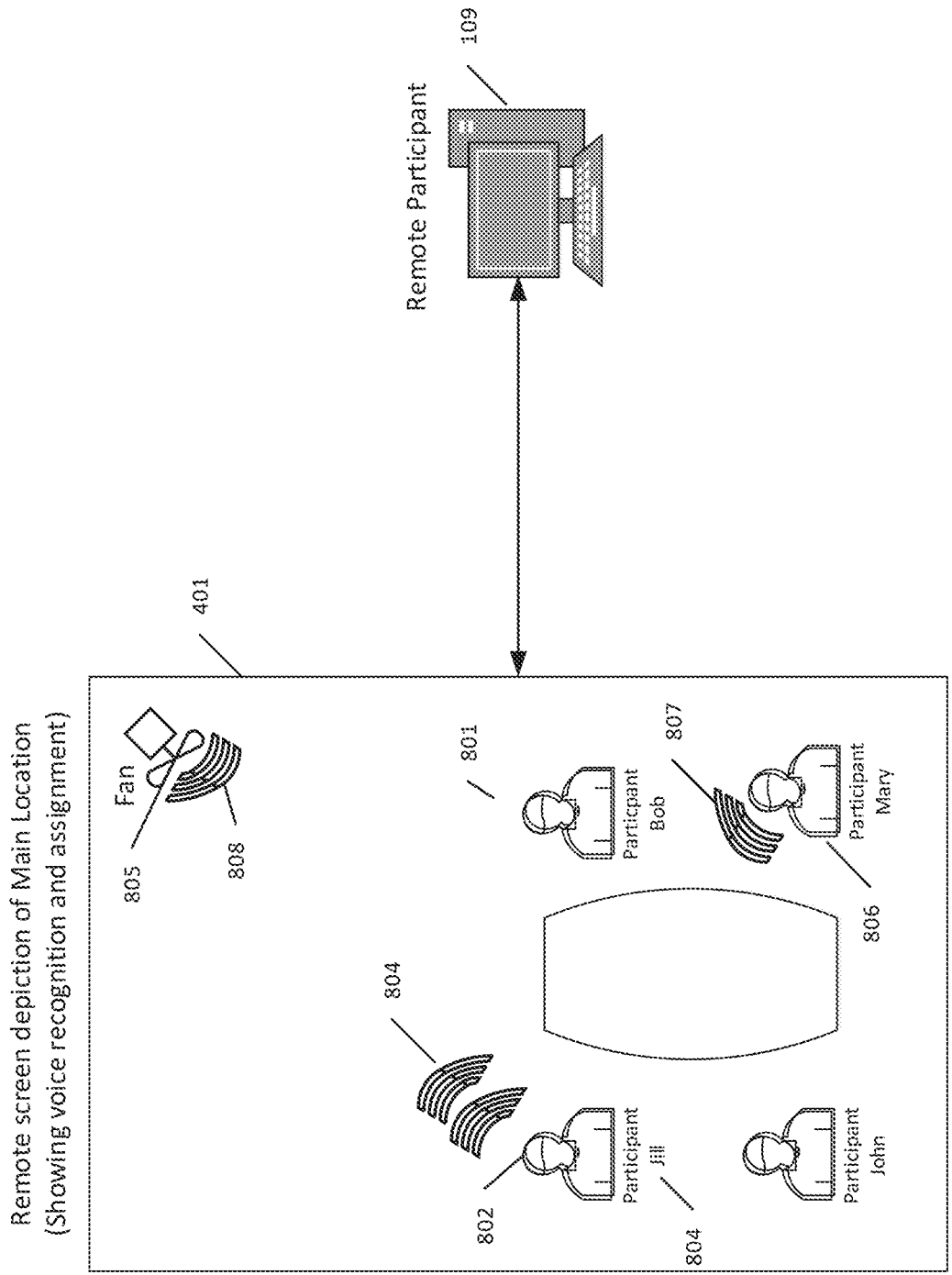
FIG. 8 is an illustration representing a user interface showing Voice recognition on a remote participants screen.

The voice recognition 203 functionality utilizes sound mapping and identification techniques to assign an ID to each sound source which can be a person or object, as shown in FIG. 8. The ID can be displayed along with the sound intensity and other parameters (for example, these may include the person's name, "Jane", there volume level, say 81 dB, and a link to her picture) on the remote participants 109 web application screen. The parameters (VR1, VR2, VR3 and VR4) 214 are passed via the network 104 through WebRTC. This gives the remote participant 109 added information to understand who is on the other end, allowing for a more engaging experience.

The output mixer 208 receives the user position signals 221 and the remote participants 109 audio output signal 218 and mixes the correct appropriate sound location to output the signal in the multi-user space 101 utilizing the correct speaker 210 within the speaker system 209. The remote participants 109 voice location will be an accurate spatial representation of where they are configured as a virtual participant in the multi-user space 101.

The internet network 104 preferably transmits bi-directional information on a per-remote participant 109 basis for left audio channel (L) & right audio channel (R) 216, Voice recognition information (VR; e.g., name, volume, picture link) 214, users position parameters (UP; e.g., x,y, direction) 217, sound (SP) position parameters (e.g., x,y) 215, and output mixer (OM) 218 audio information (e.g., sound samples). It should be noted that the number of signal channels is dynamic, based on the number of remote participants 109 signed into the system and is not limited to the number shown in the example.

Figure 3:
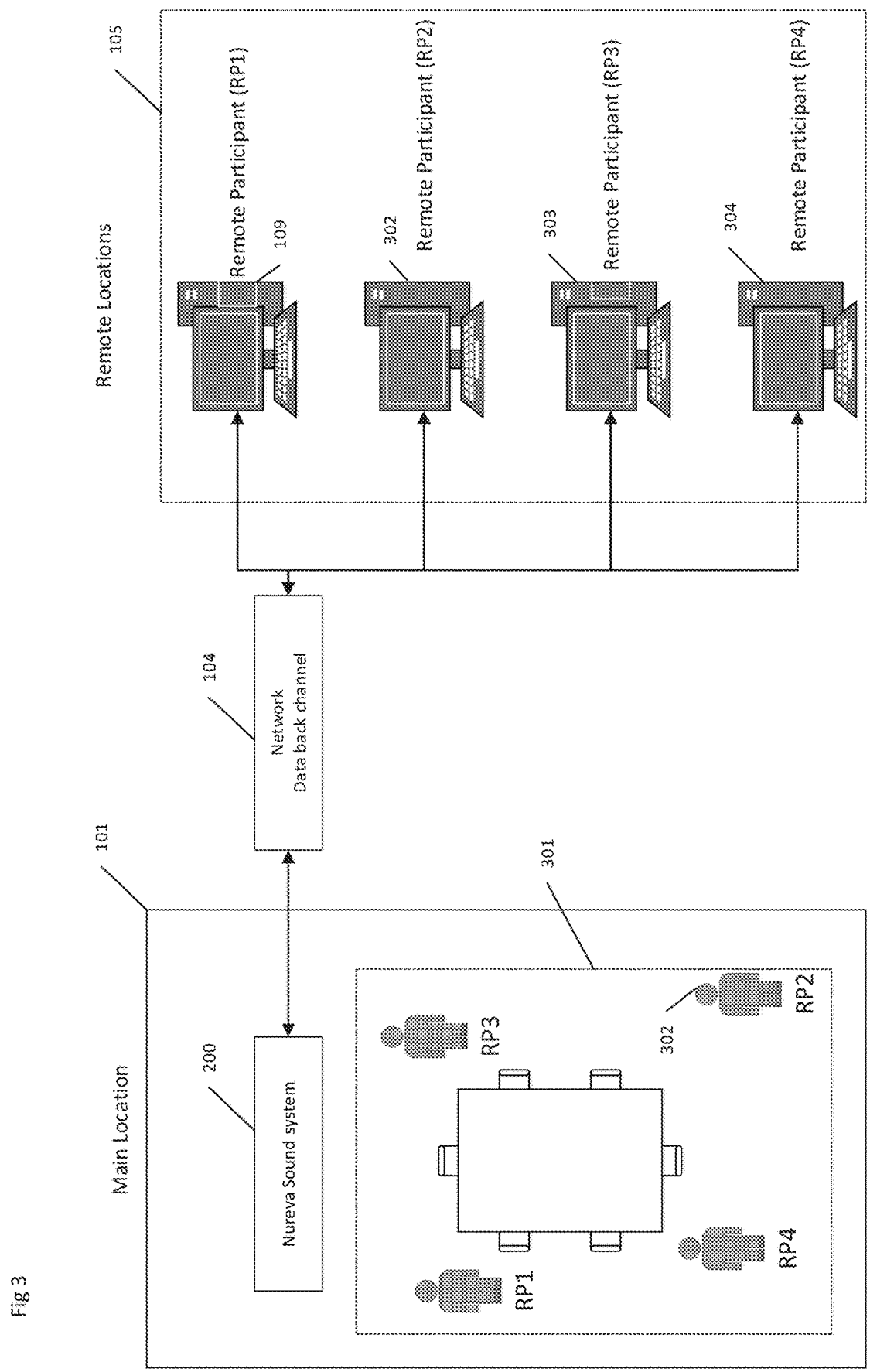
FIG. 3 is a diagrammatic illustration of virtual participants placed in the main multi-user configured space.

FIG. 3, illustrates that a plurality of remote participants 105 (for example 109,302,303 and 304) can configure their individual virtual space placement 301 in the multi-user space 101. The illustration demonstrates four remote participants 105 located 301 within the multiuser space 101. Although four participants are shown, the system can manage a plurality of participants. Virtual remote participant RP2 302 will hear all sounds in the space as if they were actually located at the physical position in 301. The sounds are corrected for spatial and left/right stereo balance. The remote participants 105 can adjust their position dynamically in real-time to a new location and the sound field would be corrected for that location. This allows the remote participants 105 to accommodate and adjust for best in-space sound quality and to be able to focus on the correct speaking participant, as needed, while reducing undesired signals through position placement.

FIGS. 4a and 4b are illustrations of how the remote participant 109 can configure their sound field 402 parameters. The remote participant 109 using a mouse or touch event on the Virtual Positioning Web application screen 401 can select from various parameters. The parameters include but are not limited to sound field size 403, remote participant rotation (facing position) 404, and remote participant position 409. All of these parameters are used to derive the in-space 101 sound field size 407, remote participant position 408, and remote participant facing direction 406. As the remote participant adjusts the parameters, the sound mixer 205 recreates the appropriate mix for the remote participant input and output audio streams. The invention can further be extended to use accelerometers or other visual cue and motion detectors to detect remote participant 109 head movement and direction and, thus, without mouse or touch input, be able to have the sound field adjusted accordingly to a representative signal of their head direction.

FIGS. 5a, 5b, and 5c illustrate how the sound field can be configured based on the remote participant's 109 settings. The multiuser space 101 is shown with three different configurations of sound field mapping, i.e., 501a, 501b and 501c. Sound field size is not limited to these three positions and can be adjusted to any size required by the Virtual Positioning Web application 401, as shown in FIGS. 4a and 4b. The system 200 can be configured for full space 501a coverage. This setting is going to pass to the remote participant all sound signals as they are related to the remote participant's 109 location in the space. The sound field can be adjusted, as shown by 501b, such that it is not full space and the sound signals would be processed within the reduced, circular and/or spherical sound field boundaries 501b. The remote participant 109 can further reduce the sound field 501c, which narrows the sound field focus even more. As the sound field is adjusted, the sound source signals are processed via the sound mixer 205 and the remote participant 109 receives a L/R stereo audio channel mix 216 that is mapped to their virtual desired position, rotation and sound field parameters.

Figure 6B:
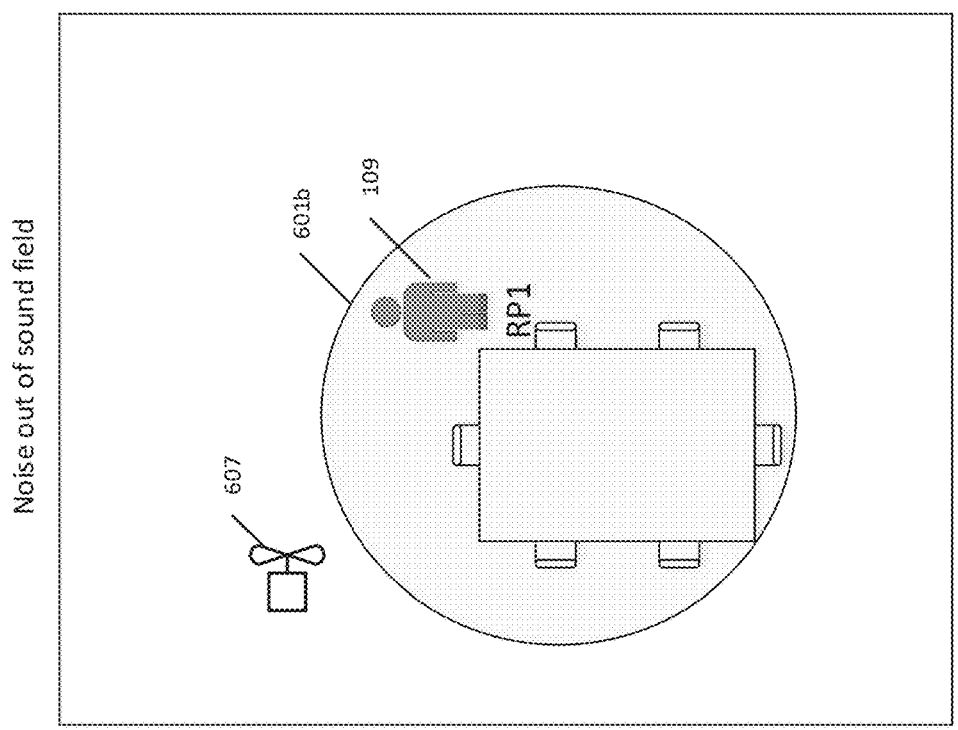
FIGS. 6a and 6b are representations of the sound field isolation capability.
Figure 6A:
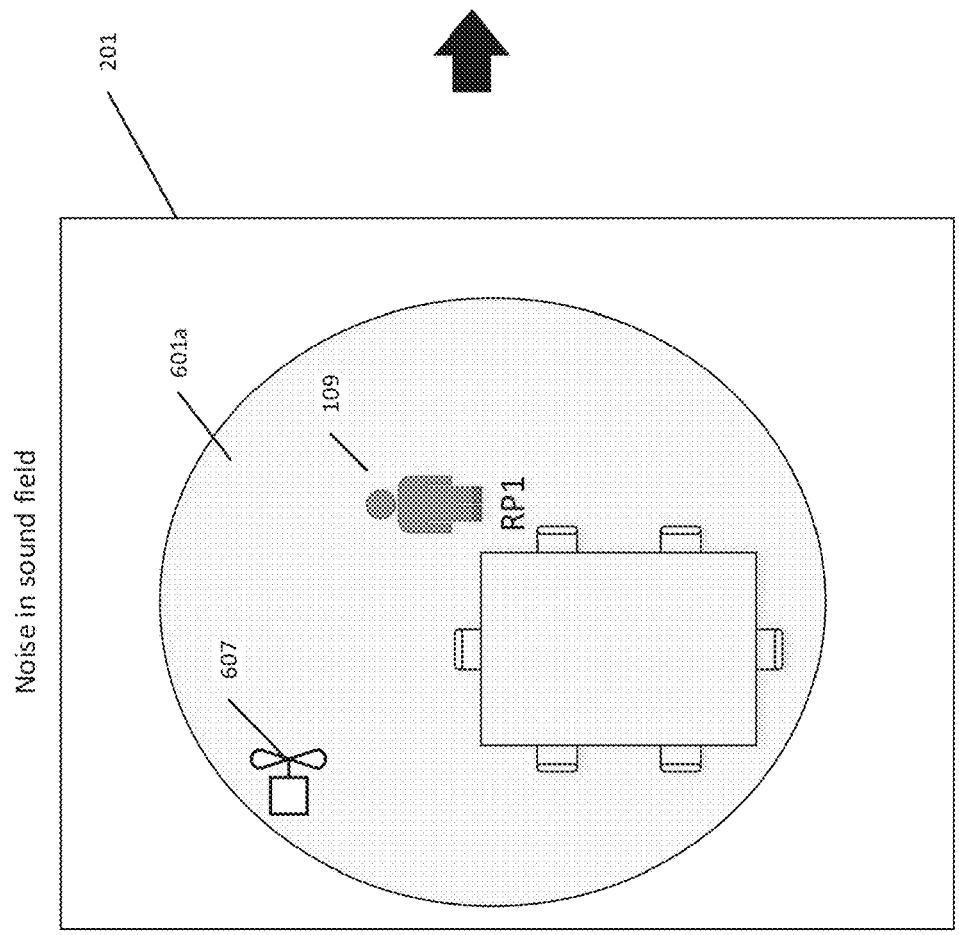

FIGS. 6a and 6b illustrate that by using sound field mapping, the remote participant 109 can adjust the sound field 601a & b to defocus the undesired noise source 607 that they hear. Sound field 601a has the noise source 607 in the focus zone and sound field 601b has been reduced sufficiently such that the undesired noise source 607 is no longer in the sound field. Undesired noise sources 607 can be anything that the remote participant 109 is not interested in hearing—such as, but not limited to, other people, fans, heating, air conditioning, and environmental noises. It should be noted that the unfocused noise sources 607 are not eliminated and only attenuated. The ear expects to hear a spectrum of noises, both background and foreground, and to eliminate background noise creates a situation that is perceived as unnatural and not pleasant to listen to. In focusing the sound field 601b through careful tuning and calibration, the spatial information of the background noise is left intact and merged with the desired sound source to create an appropriate balanced audio presentation that brings the desired sounds forward and the undesired sounds lower in the mix. This is accomplished through the sound mixer 205.

Figure 7B:
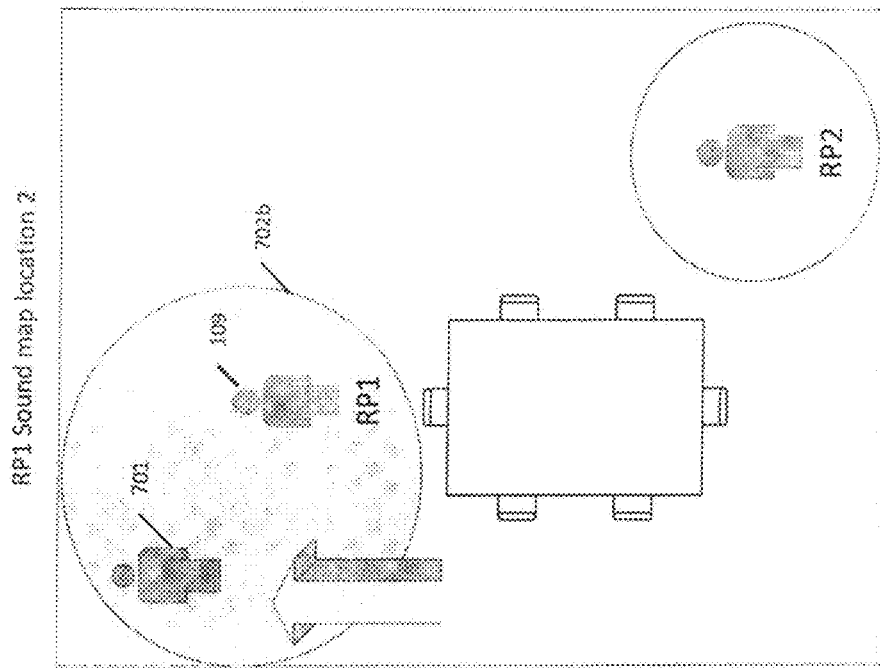
FIGS. 7a and 7b are illustrations showing how the sound field can map to a moving sound source.
Figure 7A:
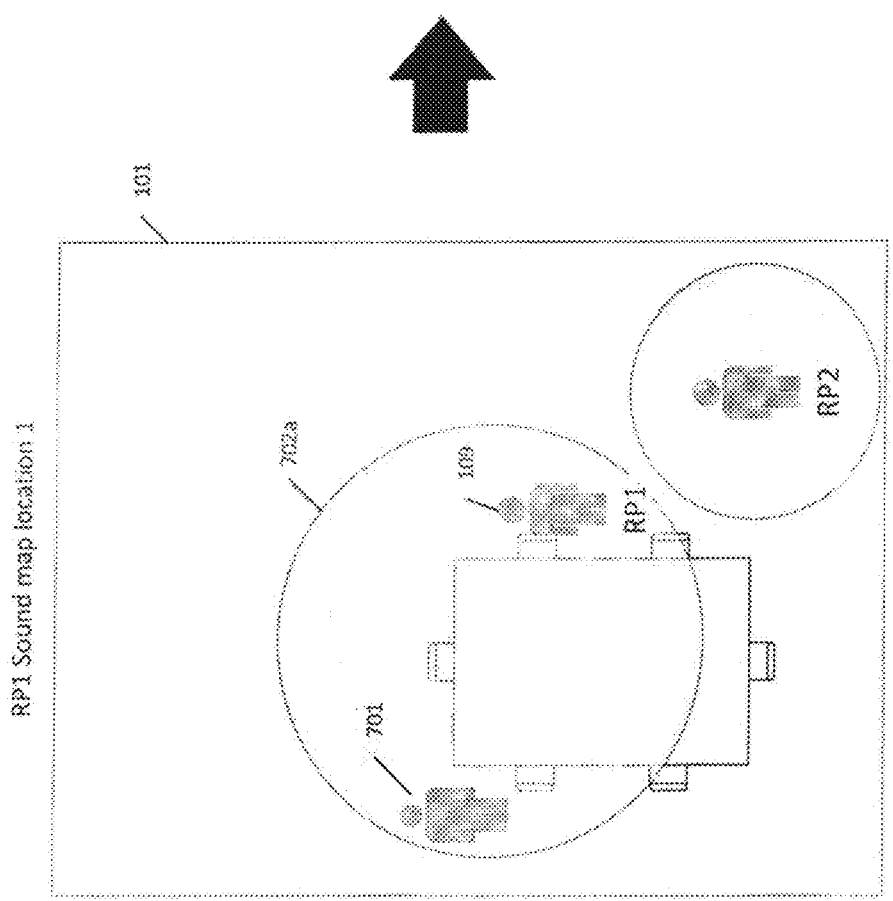

FIGS. 7a and 7b illustrate how the remote participant 109 can adjust their sound field 702 location and size to track and receive a moving sound source 701, which in this case is a person as they move throughout the space. FIG. 7a illustrates the sound field 702a mapped to the current location of the sound source 701. FIG. 7b illustrates that the desired sound source 701 has moved and the remote participant 109 has adjusted their position to the new desired sound source 701 position. The remote participant 109 could have also changed the sound field size as shown in FIG. 5. A plurality of sound sources 701 be tracked and monitored for each remote participant 109 across a plurality of remote participants 105.

FIG. 8 illustrates how the remotes participant 109 Virtual Positioning Web application 401 shows the identified sound sources' 806, 802 and 805 names on the screen—such as, for example, Jill, Bob, Mary, and Fan. This is accomplished via the voice recognition module 203, which passes the sound source attribute data 214 to the Virtual Positioning web app 401 for display to the remote participant 109. Participant 802, 806, and the fan 805 also have extra description data 804, 807, and 808 that shows they are active. The description data can contain, but is not limited to, name ID, sound field intensity, and direction information allowing for a more immersive and descriptive experience. The participant 802 is louder than participant 806 so his/her intensity indicator 804 is larger. The descriptor data will be tagged and displayed for all active sound sources in the space so the remote participant 109 can see where all sound sources are located and configure their listening experience accordingly. If five active sound sources are present, five descriptor data fields are displayed.

Figure 9B:
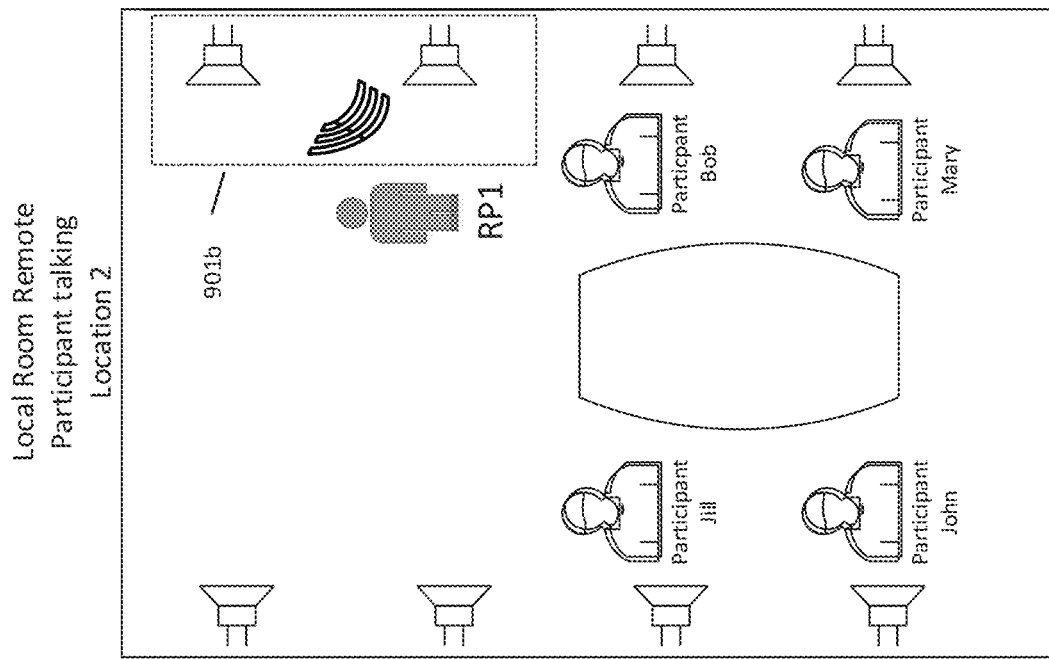
FIGS. 9a and 9b are illustrations of how a remote participant can be mapped to a multi-user space audio speaker position.
Figure 9A:
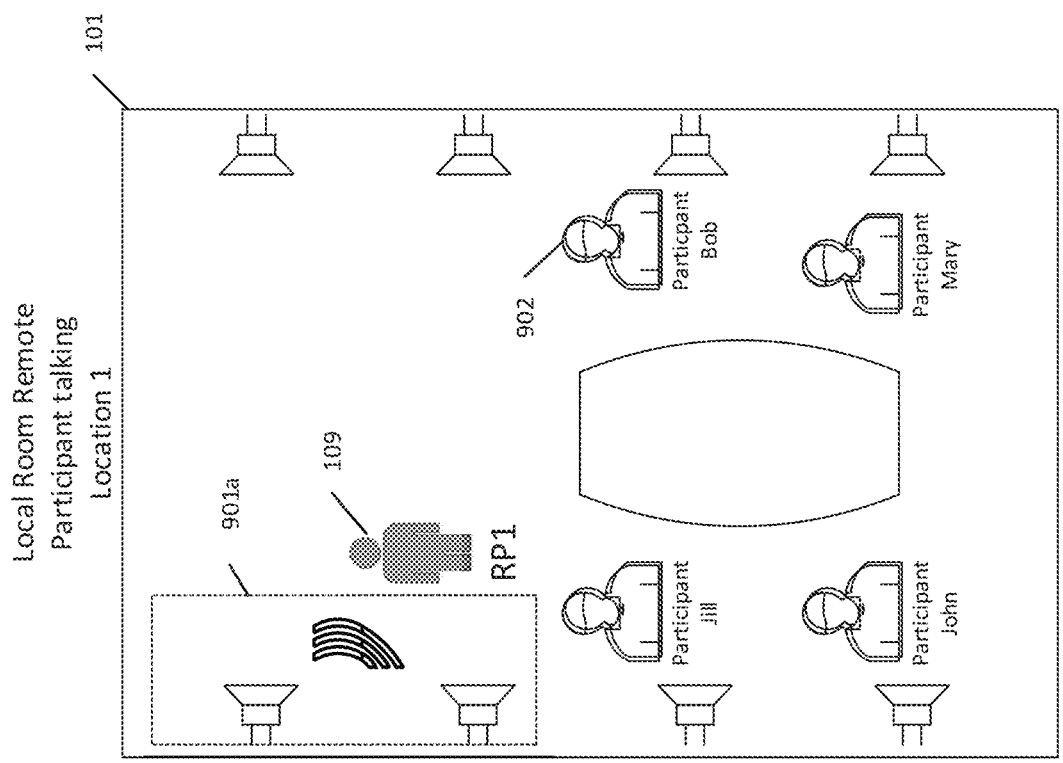

FIGS. 9a and 9b illustrate the ability of the system to present, through the in-space audio system speakers 209, where the remote participant 109 is virtually located in the space 101. The remote participant 109 is initially at the upper left hand section of the space 101, as illustrated in FIG. 9a. As a result, the speakers 901a in the speaker system 209 are active so the person 902 in space 101 is hearing the sound as if the remote participant 109 is actually in the space 101 at their configured location. This is accomplished via the output mixer 208, which sends a specific mix to the audio speakers system 209 to enable this presentation. FIG. 9b illustrates the remote participant 109 relocating to the upper right hand corner of the space as the sound follows to speaker group 901b—thus creating a realistic experience as if the virtual remote person 109 moves. It should be noted that this capability is configurable and can be turned on and off through the Nureva sound system 200 configuration and user settings.

FIG. 10, illustrates how the plurality of virtual microphone bubbles 1001 are mapped to a space 1003 (e.g., space 101) with (x,y,z) coordinates 1002 to locate their exact position in 3D space. Since the processing gain can be derived through the bubble processor 207, the strength of the sound source signal (s) at various locations in the space can be known. Since a sound field map can be derived from the microphone bubble array 1001, the location relational sound patterns that are specific to a virtual remote participant's 109 position in the space 101 can be derived.

Although this invention has been illustrated in a conference multi-user space scenario, the principles and application are directly applicable to any sound space environment—such as, but not limited to, passenger cabins, control rooms and spaces, lecture halls, class spaces, meeting spaces, and/or any configuration which allows for a space that is suitable to configure with a Nureva sound system to enable remote participation and control of the audio listening experience.

The individual components shown in outline or designated by blocks in the attached Drawings are all well-known in the electronic processing arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for each one of plural remote participants, who are remote from a shared physical space that has (i) a plurality of physical microphones, and (ii) a desired sound source, to individually configure his/her individual sound field map in the shared physical space, to focus on the desired sound source, comprising:

receiving, from the plurality of physical microphones in the shared physical space, sound signals of the shared physical space including (i) positional information and (ii) sound signals of the physical microphones;

identifying, by one or more processors, the at least one desired sound source in the shared physical space based on the received sound signals of the physical microphones;

defining, by the one or more processors, an array of virtual microphone bubbles in the shared physical space;

mapping, by the one or more processors, respective physical locations of the desired sound source in the shared physical space, based on the received sound signals of the physical microphones;

receiving, by the one or more processors and from the plurality of remote participants, signals corresponding to his/her respective sound field map parameters in the shared physical space, each remote participant having his/her own audio reproduction equipment, the sound field map parameters including information corresponding to the defined array of virtual microphone bubbles;

mixing, by the one or more processors, the received sound signals of the physical microphones from the shared physical space to output corresponding mixed sound signals to each of the remote participants, based on relationships between (i) the respective locations of the desired sound source in the shared physical space and (ii) the respective sound field map parameters of said each remote participant in the shared physical space; and transmitting, by the one or more processors, the corresponding mixed sound signals to each remote participant;

wherein each remote participant can independently control his/her sound field map parameters in the shared physical space including sound field map size and/or shape, to focus on the desired sound source.

2. The method according to claim 1, wherein there are plural sound sources in the shared physical space.

3. The method according to claim 1, wherein each remote participant has at least one participant processor configured to independently control position parameters in the shared physical space including (i) facing position, and (ii) position, within the shared space.

4. The method according to claim 3, wherein each remote participant can independently control in real-time his/her position parameters in the shared physical space including (i) sound field size and/or shape, (ii) facing position, and (iii) position, within the shared space.

5. The method according to claim 4, wherein each remote participant can attenuate his/her reception of sound from a sound source in the shared physical space.

6. The method according to claim 1, further comprising displaying to each remote participant a plurality of sound sources within the shared physical space.

7. The method according to claim 6, further comprising displaying to each remote participant indicia of volumes of at least two sound sources within the shared physical space.

8. The method according to claim 1, wherein each remote participant can independently (i) focus the plurality of physical microphones on a desired sound source in the shared physical space, and (ii) defocus the plurality of physical microphones from an undesired sound source in the shared physical space.

9. The method according to claim 1, wherein the shared physical space includes an undesired sound source, and wherein each remote participant can independently control his/her sound field map parameters in the shared physical space to unfocus on the undesired sound source.

10. The method according to claim 1, further comprising tracking a moving desired sound source in the shared physical space.

11. The method according to claim 1, wherein the remote participant comprises a second shared physical space.

12. The method according to claim 1, wherein there are multiple sound field maps in the shared physical space.

13. The method according to claim 1, wherein there are multiple sound field maps for at least one remote participant in the shared physical space.

14. An sound apparatus for each one of plural remote participants, who are remote from a shared physical space that has (i) a plurality of physical microphones, and (ii) a desired sound source, to individually configure his/her individual sound field map in the shared physical space, to focus on the desired sound source, comprising:

an interface configured to receive, from a plurality of physical microphones in the shared physical space, (i) positional information and (ii) sound signals of the physical microphones;

a network interface configured to receive, from the plural remote participants, respective position parameters in the physical shared space; and one or more processors configured to:
identify the desired sound source in the shared physical space based on the received sound signals of the physical microphones;
defining an array of virtual microphone bubbles in the shared physical space;
map respective physical locations of the desired sound source in the shared physical space, based on the received sound signals of the physical microphones;
receive from the plurality of remote participants, signals corresponding to his/her respective sound field map parameters in the shared physical space, each remote participant having his/her own audio reproduction equipment, the sound field map parameters including information corresponding to the defined array of virtual microphone bubbles;
mix the received sound signals from the shared physical space to output corresponding sound signals to each of the remote participants based on relationships between (i) the respective locations of the desired sound source in the shared physical space and (ii) the respective sound field map parameters of said each remote participant in the shared physical space; and
transmit the corresponding mixed sound signals to each remote participant via the network interface wherein each remote participant can independently control his/her sound field map parameters in the shared physical space including sound field map size and/or shape, to focus on the desired sound source.

15. The apparatus according to claim 14, wherein there are plural desired sound sources in the shared physical space.

16. The apparatus according to claim 14, wherein each remote participant has at least one participant processor configured to independently control position parameters in the shared physical space including (i) facing position, and (ii) position, within the shared space.

17. The apparatus according to claim 16, wherein each remote participant's at least one participant processor is configured to independently control in real-time his/her position parameters in the shared physical space including (i) sound field size and/or shape, (ii) facing position, and (iii) position, within the shared space.

18. The apparatus according to claim 14, wherein each remote participant's at least one participant processor is configured to attenuate his/her reception of sound from a sound source from the shared physical space.

19. The apparatus according to claim 14, further comprising one or more remote participant display configured to display to each remote participant a plurality of sound sources within the shared physical space.

20. The apparatus according to claim 19, wherein the one or more remote participant display is configured to display to each remote participant indicia of volumes of at least two sound sources within the shared physical space.

21. The apparatus according to claim 14, wherein each remote participant has at least one processor configured to independently (i)focus the plurality of physical microphones on the desired sound source in the shared physical space, and (ii) defocus the plurality of physical microphones from an undesired sound source in the shared physical space.

22. The apparatus according to claim 14, wherein the shared physical space includes an undesired sound source, and wherein each remote participant can independently control his/her sound field map parameters in the shared physical space to unfocus on the undesired sound source.

23. The apparatus according to claim 14, wherein the one or more processors tracks a moving desired sound source in the shared physical space.

24. The apparatus according to claim 14, wherein the remote participant comprises a second shared physical space.

25. The apparatus according to claim 14, wherein the one or more processors provides multiple sound field maps in the shared physical space.

26. The apparatus according to claim 14, wherein the one or more processors provides multiple sound field maps for at least one remote participant in the shared physical space.

27. At least one non-transitory computer readable storage medium storing one or more programs, the one or more programs comprising instructions, which, when executed by one or more processors, perform a method for each one of plural remote participants, who are remote from a shared physical space that has (i) a plurality of physical microphones, and (ii) a desired sound source, to individually configure his/her individual sound field map in the shared physical space, to focus on the desired sound source, comprising:
  receiving, from the plurality of physical microphones in the shared physical space, sound signals of the shared physical space including (i) positional information and (ii) sound signals, of the physical microphones;
  identifying, by one or more processors, the desired sound source in the shared physical space based on the received sound signals;
  defining, by the one or more processors, an array of virtual microphone bubbles in the shared physical space;
  mapping respective physical locations of the desired sound source in the shared physical space based on the received sound signals;
  receiving, from the remote participants, signals corresponding to his/her respective sound field map parameters in the shared physical space, each remote participant having their own audio reproduction equipment, the sound field map parameters including information corresponding to the defined array of virtual microphone bubbles;
  mixing the received sound signals to output corresponding mixed sound signals from the shared physical space to each remote participant based on (i) relationships between the respective locations of the desired sound source in the shared physical space and (ii) the respective sound field map parameters of said each remote participant in the shared physical space; and
  transmitting the corresponding mixed sound signals to each remote participant;
  wherein each remote participant can independently control his/her sound field map parameters in the shared physical space including sound field map size and/or shape, to focus on the desired sound source.

28. The computer readable storage medium according to claim 27, wherein the instructions, when executed by one or more processors, perform the method where there are plural desired sound sources in the shared physical space.

29. The computer readable storage medium according to claim 27, wherein the instructions, when executed by one or more processors, perform the method wherein each remote participant can independently control his/her position parameters in the shared physical space including (i) facing position, and (ii) position, within the shared space.

30. The computer readable storage medium according to claim 29, wherein the instructions, when executed by one or more processors, perform the method wherein each remote participant can independently control in real-time his/her position parameters in the shared physical space including (i) sound field size and/or shape, (ii) facing position, and (iii) position, within the shared space.

31. The computer readable storage medium according to claim 30, wherein the instructions, when executed by one or more processors, perform the method wherein each remote participant can attenuate his/her reception of sound from a sound source in the shared physical space.

32. The computer readable storage medium according to claim 27, wherein the instructions, when executed by one or more processors, perform the method of displaying to each remote participant a plurality of sound sources within the shared physical space.

33. The computer readable storage medium according to claim 32, wherein the instructions, when executed by one or more processors, perform the method of displaying to each remote participant indicia of volumes of at least two sound sources within the shared physical space.

34. The computer readable storage medium according to claim 27, wherein the instructions, when executed by one or more processors, perform the method wherein each remote participant can independently (i) focus the plurality of microphones on the desired sound source in the shared physical space, and (ii) defocus the plurality of microphones from an undesired sound source in the shared physical space.

35. The computer readable storage medium according to claim 27, wherein the instructions, when executed by one or more processors, perform the method whereby the shared physical space includes an undesired sound source, and wherein each remote participant can independently control his/her sound field map parameters in the shared physical space to unfocus on the undesired sound source.

36. The computer readable storage medium according to claim 27, wherein the instructions, when executed by one or more processors, perform the method further comprising tracking a moving desired sound source in the shared physical space.

37. The computer readable storage medium according to claim 27, wherein the instructions, when executed by one or more processors, perform the method wherein the remote participant comprises a second shared physical space.

38. The computer readable storage medium according to claim 27, wherein the instructions, when executed by one or more processors, perform the method wherein there are multiple sound field maps in the shared physical space.

39. The computer readable storage medium according to claim 27, wherein the instructions, when executed by one or more processors, perform the method wherein there are multiple sound field maps for at least one remote participant in the shared physical space.

* * * * *